United States Patent
Okita et al.

(10) Patent No.: US 6,997,078 B2
(45) Date of Patent: Feb. 14, 2006

(54) BALL SCREW APPARATUS

(75) Inventors: Shigeru Okita, Gunma (JP); Daisuke Maruyama, Gunma (JP); Junji Minakuchi, Gunma (JP)

(73) Assignee: NSK Ltd., Tokyo (JP)

( * ) Notice: Subject to any disclaimer, the term of this patent is extended or adjusted under 35 U.S.C. 154(b) by 30 days.

(21) Appl. No.: 10/307,946

(22) Filed: Dec. 3, 2002

(65) Prior Publication Data
US 2003/0121347 A1    Jul. 3, 2003

(30) Foreign Application Priority Data
Dec. 4, 2001  (JP)  ............ P.2001-370588

(51) Int. Cl.
*F16H 1/18* (2006.01)

(52) U.S. Cl. .............. 74/424.88; 384/51
(58) Field of Classification Search ........... 74/424.88, 74/424.81; 384/51
See application file for complete search history.

(56) References Cited

U.S. PATENT DOCUMENTS

| | | | |
|---|---|---|---|
| 6,095,009 A | | 8/2000 | Takagi |
| 6,435,720 B1 * | | 8/2002 | Yabe et al. ............... 384/43 |
| 6,443,620 B1 * | | 9/2002 | Chiu et al. ............... 384/45 |
| 2001/0037699 A1 * | | 11/2001 | Abe et al. ............ 74/424.88 |
| 2003/0039414 A1 * | | 2/2003 | Niwa et al. ............... 384/51 |
| 2003/0194160 A1 * | | 10/2003 | Yabe et al. ............... 384/43 |
| 2003/0221502 A1 * | | 12/2003 | Okita et al. ........... 74/424.88 |
| 2004/0020317 A1 * | | 2/2004 | Yamamoto ........... 74/388 PS |
| 2004/0047525 A1 * | | 3/2004 | Kasuga et al. ............ 384/45 |

FOREIGN PATENT DOCUMENTS

| | | |
|---|---|---|
| DE | 199 25 040 A1 | 12/1999 |
| DE | 100 52 204 A1 | 7/2001 |
| DE | 101 10 220 A1 | 9/2001 |
| JP | 2001-21018 A1 | 1/2001 |

OTHER PUBLICATIONS

Patent Abstracts of Japan, vol. 2000, No. 2, Publication No. 11315835.

Hiroki Yamaguchi et al., "Development of NSK S1 Series, Ball Screws and Linear Guides", Motion and Control No. 11, Oct. 2001 pp. 27-34.

* cited by examiner

*Primary Examiner*—David M. Fenstermacher
(74) *Attorney, Agent, or Firm*—Sughrue Mion, PLLC

(57) ABSTRACT

A ball screw apparatus which can suppress retaining pieces from contacting a wall of a ball rolling path or ball circulating path, and suppress the retaining pieces between the balls from falling down, so that such a ball screw apparatus can be improved in noise reduction, operability and endurance. The retaining piece is rounded at an edge portion opposite to the ball, such that a radius of curvature of the edge portion is defined to be 0.05 mm to 1 mm, and the outer diameter of the retaining piece is in a range of 0.60 times or more to 0.85 times or less of the diameter of the ball.

3 Claims, 5 Drawing Sheets

SPHERE

CONICAL SHAPE WITH HOLE

GOTHIC ARCH SHAPE WITH HOLE

BALL SCREW APPARATUS

BACKGROUND OF THE INVENTION

The present invention relates to a ball screw apparatus, and in particular a technique effective for realizing more improvement of low noises, operationability and endurance.

For example, the ball screw apparatus is, as shown in FIGS. 8 and 9, composed of a screw shaft 1 and a nut 2. The screw shaft 1 has a first spiral screw groove 3 on an outer circumferential face thereof. The nut 2 has a second screw groove 4 on its inner circumferential face in opposition to the first screw groove 3 defined in the screw shaft 1. The nut 2 is meshed with the screw shaft 1 through a plurality of balls 5 rotatably charged in a spiral ball rolling path T defined between the first and second screw grooves 3 and 4. The ball rolling path T is provided at its one end with a ball circulating path J for taking up the balls rolling and tracking in the ball rolling path T and sending to the other end. If relatively rotating the screw shaft 1 and the nut 2, and moving one of them in an axial direction, this ball screw apparatus endlessly performs relatively spiral movement between the screw shaft 1 and the nut 2 through rolling of the plural balls 5.

In the ball screw apparatus of such a structure, the ball rolling path T has a face of, for example, Gothic arch, and the ball 5 rolls under an angular contact with the T-face of the ball rolling path at two to four points, while the ball rolling path T spirally continues and by having a return mechanism of the ball circulating path J, change from an on-loaded condition to a loaded condition happens. Since the ball 5 under the loaded condition does not form an ideal rolling condition but creates a spin phenomenon, the ball is easy to cause slip and a ball abrasion occurs. Further, since the adjacent balls 5 contact under a condition of rolling in opposite directions each other, slip is caused between the loaded balls 5. As a result, the balls 5 are prevented from free rolling, and there arise various problems of bad working of the balls, creation of abrasion and damage, fluctuation of torque, or occurrence of noises.

Particularly, in the ball screw apparatus effected on and off with high load applied to an injection molding machine or pressing operation, not only osculating ellipse is large owing to elastic deformation between the ball 5 and the ball rolling path T, but also competition of the ball 5 particular to the ball screw apparatus occurs, so that the abrasion and damage appear more remarkably.

For solving these problems, as shown in FIG. 9, such a measure has been broadly practiced where the retaining pieces 10 having recesses 11 at opposite to the balls 5 are interposed between the adjacent balls 5 rolling and tracking in the ball rolling path T, and this measure enables to suppresses competition of the balls 5.

However, by interposing the retaining pieces 10, a new problem arises that the retaining piece 10 and the ball 5 compete against each other, so that the retaining pieces 10 are effected with abrasion and damage. Abrasion and damage of the retaining piece 10 create spaces around the retaining piece 10, and a sum total in spaces of the retaining pieces 10 and the balls 5 at an initial period (when setting the retaining piece 10 to the ball screw apparatus) inconveniently grow while using the ball screw apparatus. When the sum total in spaces of the retaining pieces 10 and the balls 5 increase and the spaces gather to one position, the retaining piece 10 falls as shown in FIG. 10 to probably cause bad working or earlier damage of the ball screw apparatus.

Japanese Patent Laid Open 21018/2001 discloses therefore a measure of interposing elastic materials between the adjacent balls together with the retaining pieces. Depending on this measure, if the ball is effected with high load on and off, it is possible to suppress abrasion and damage acting on the retaining pieces and the balls.

However, in the above measure, if the elastic material placed between the adjacent balls together with the retaining pieces is loaded, spring force of the elastic material acting on the loaded ball is powerless, and inconveniently a space adjusting capacity is not enough. Therefore, depending on space growth owing to abrasion and damage of the retaining piece and the ball, the retaining piece might fall, and there still remains a room for improvement.

In the above measure, an outer diameter of the retaining piece is set to be smaller than a diameter of the ball and this difference is determined to be larger than elastic deformation generated in the ball, but even the retaining pieces satisfying this condition might contact walls of the spiral ball rolling path or ball circulating path when passing them. Consequently, such inconvenience probably cause bad working or earlier damage of the ball screw apparatus, and there is still a room for determining sizes of the outer diameter of the retaining piece.

SUMMARY OF THE INVENTION

In view of the above mentioned circumstances, the invention has been realized, and especially with respect to the ball screw apparatus effected with high load on and off, and it is an object of the invention to provide a ball screw apparatus which prevents the retaining piece from contacting the walls of the ball rolling path or the ball circulating path and avoids the retaining pieces between the balls from falling, thereby enabling to more improve operating ability, low noises, and endurance.

For solving the problems, a first ball screw apparatus according to the invention is concerned with a ball screw apparatus which has a screw shaft defined with a first spiral screw groove on an outer circumferential face thereof, a nut having a second screw groove on an inner circumferential face in opposition to the first screw groove defined in the screw shaft and being in mesh with the screw shaft via a plurality of balls rotatably charged in a spiral ball rolling path defined between the first and second screw grooves, and retaining pieces interposed between the adjacent balls and having recess portions in opposite faces to the balls, characterized in that an edge portion of the retaining piece in the opposite face to the ball is rounded while radius of curvature of the edge portion is 1 mm or less.

The edge portion of the retaining piece in the opposite face to the ball is meant herein, in case the retaining piece is, e.g., cylindrical, by an outer circumferential edge portion of a circle of the opposite face to the ball, and in case of being polygonal, by an outer edge portion of the circle of the opposite face to the ball A second ball screw apparatus according to the first invention is characterized in that the height of the retaining piece is 0.60 times or above to 0.85 times or below of the diameter of the ball.

The height of the retaining piece designates herein a length size of the retaining piece vertical with respect to a ball tracking direction, and in case the retaining piece is cylindrical or columnar, the height is meant by a size of an outer diameter, and in case the retaining piece is polygonal, it is meant by a size of polygonal circumscribed circle diameter.

DETAILED DESCRIPTION OF THE PREFERRED EMBODIMENTS

Explanation will be made as follows to one embodiment of the invention, referring to the attached drawings.

Figure 1:
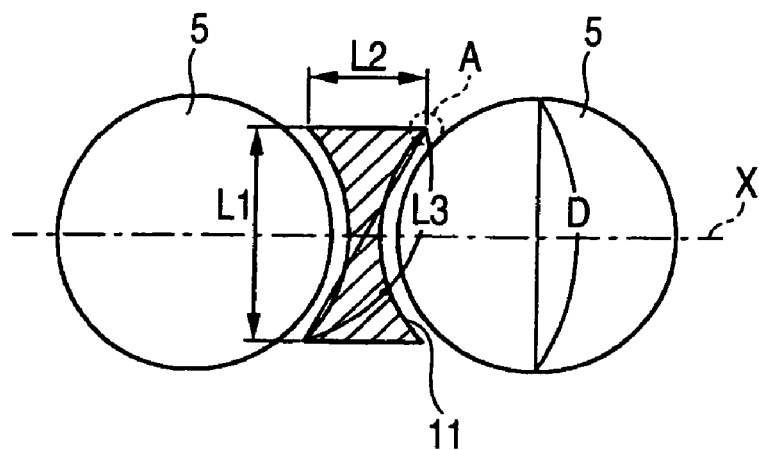
FIG. 1 is a cross sectional view showing one structural example of the ball screw apparatus according to the invention.
Figure 2:
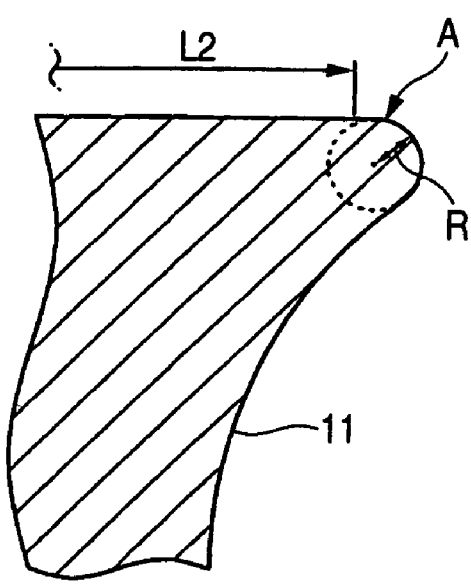
FIG. 2 is a cross sectional view enlarging an "A" portion of the retaining piece in FIG. 1.
Figure 3:
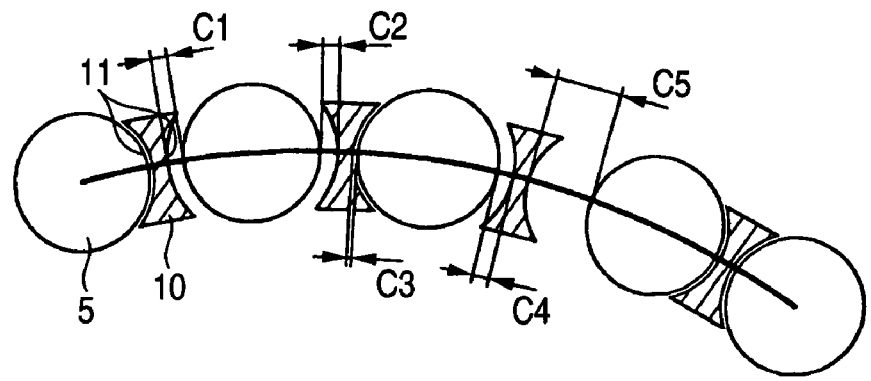
FIG. 3 is a cross sectional view showing one structural example of the ball screw apparatus according to the invention, explaining spaces between the balls and the retaining pieces.
Figure 8:
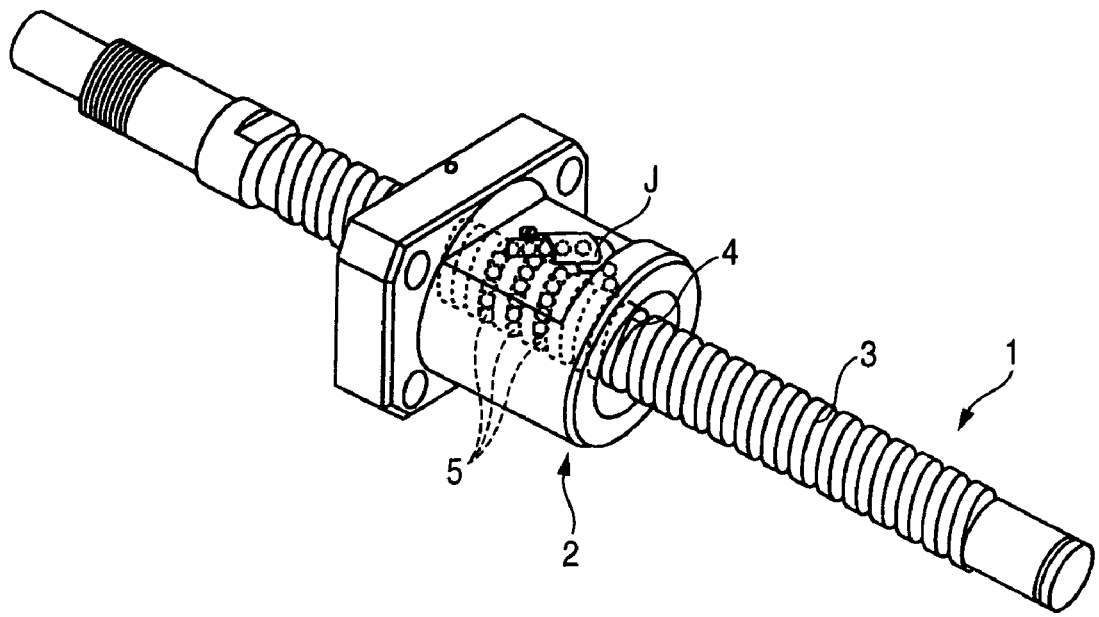
FIG. 8 is a perspective view showing one structural example of a conventional ball screw apparatus.
Figure 9:
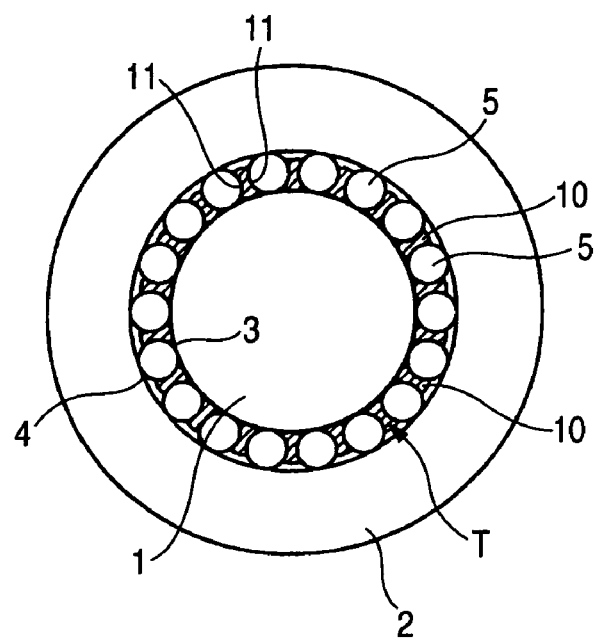
FIG. 9 is a cross sectional view of the ball screw apparatus shown in FIG. 8.

FIG. 1 is a cross sectional view showing one structural example of the ball screw apparatus according to the invention. FIG. 2 is a cross sectional view enlarging an "A" portion of the retaining piece in FIG. 1. FIG. 3 is cross sectional views showing one structural example of the ball screw apparatus according to the invention and explaining spaces between the balls and the retaining pieces. By the way, since the ball screw apparatus in this embodiment is different only in the retaining piece 10 placed between the-adjacent balls 5 in the ball rolling path with respect to the conventional ball screw apparatus shown in FIGS. 8 and 9, only different points will be explained.

In the ball screw apparatus of this embodiment, the retaining piece 10 is shaped in short cylinder with, for example, Nylon 2020 (made by Ube Industries, Ltd.), and as shown in FIG. 1, is formed with recesses 11 having an outer diameter approximate to an outer diameter L1 of the retaining piece 10 in an opposite face to the ball 5 in a ball tracking direction X (lateral directions in FIG. 1) and a curvature approximate to a sphere of the ball 5.

Further, the edge portion opposite to the ball 5 of the retaining piece 10 is rounded, and a radius of curvature R of the edge portion is defined to be 1 mm or less. In this embodiment, since the retaining piece 10 is cylindrical, the edge portion designates respective outer circumferential portions of two circles being opposite to the ball 5.

In addition, the height of the retaining piece 10 is set to be 0.60 times or above to 0.8 times or below of the diameter D of the ball 5. Herein, the height of the retaining piece 10 designates, in FIG. 1, a length size of the retaining piece 10 in a direction vertical (vertical direction in FIG. 1) with respect to the tracking direction X of the ball 5, and in this embodiment, it is an outer diameter L1 of the retaining piece 10.

Figure 4:
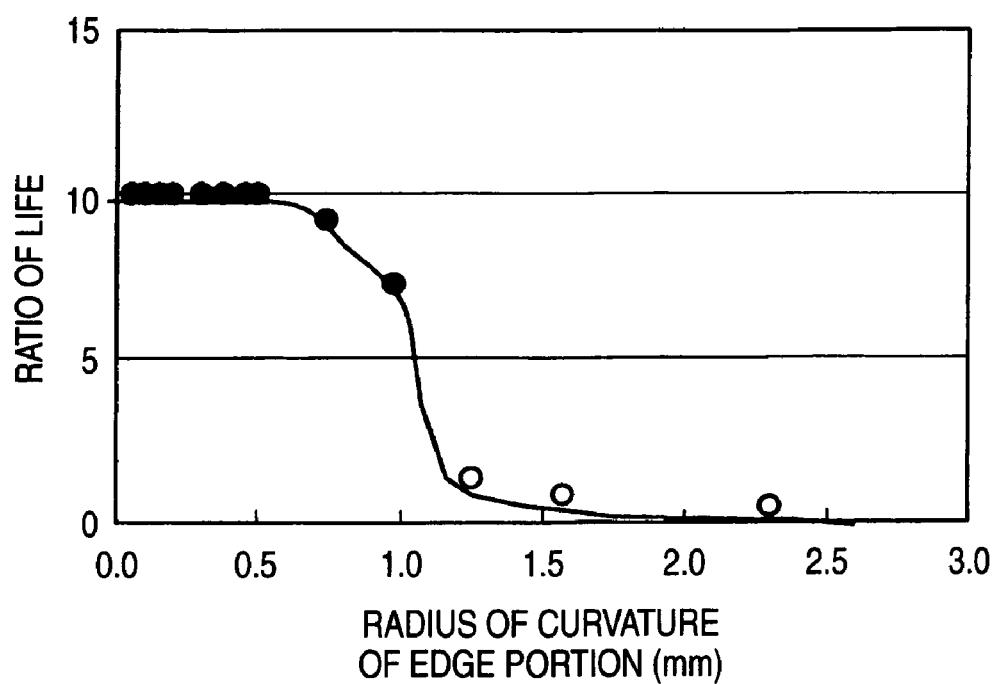
FIG. 4 is a view showing the relationship between radius of curvature R of an edge portion opposite to the ball of the retaining piece and the life of the ball screw apparatus in the ball screw apparatus using the retaining piece of an outer diameter being 0.75 times of the ball diameter.
Figure 5:
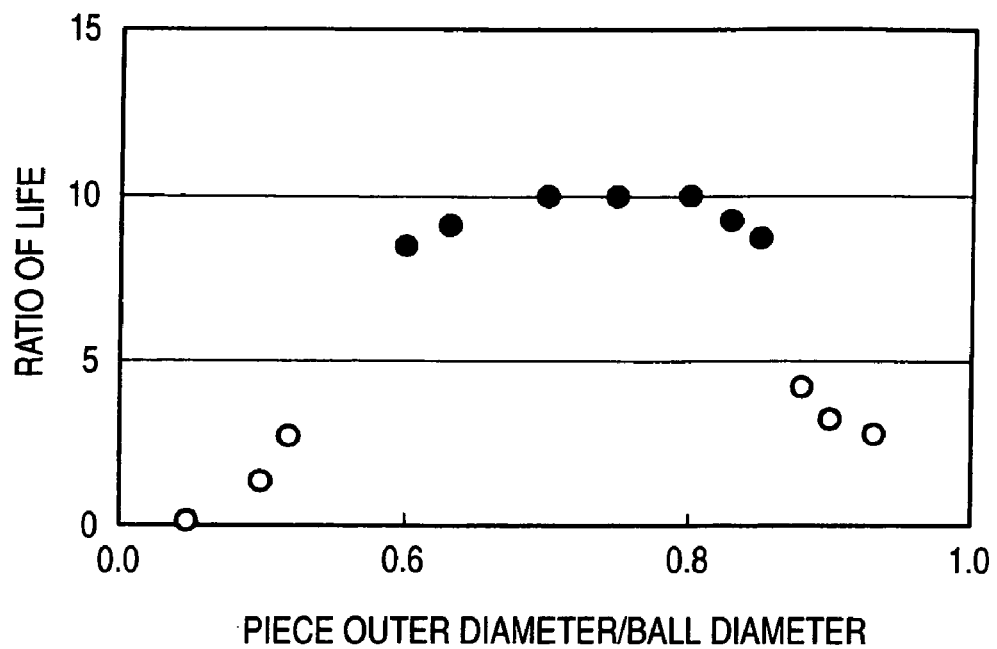
FIG. 5 is a view showing the relationship between ratio of the outer diameter of the retaining piece vs. the ball diameter and the life of the ball screw apparatus in the ball screw apparatus using the retaining piece of radius of curvature R of an edge portion opposite to the ball being 0.2 times.
Figure 6:
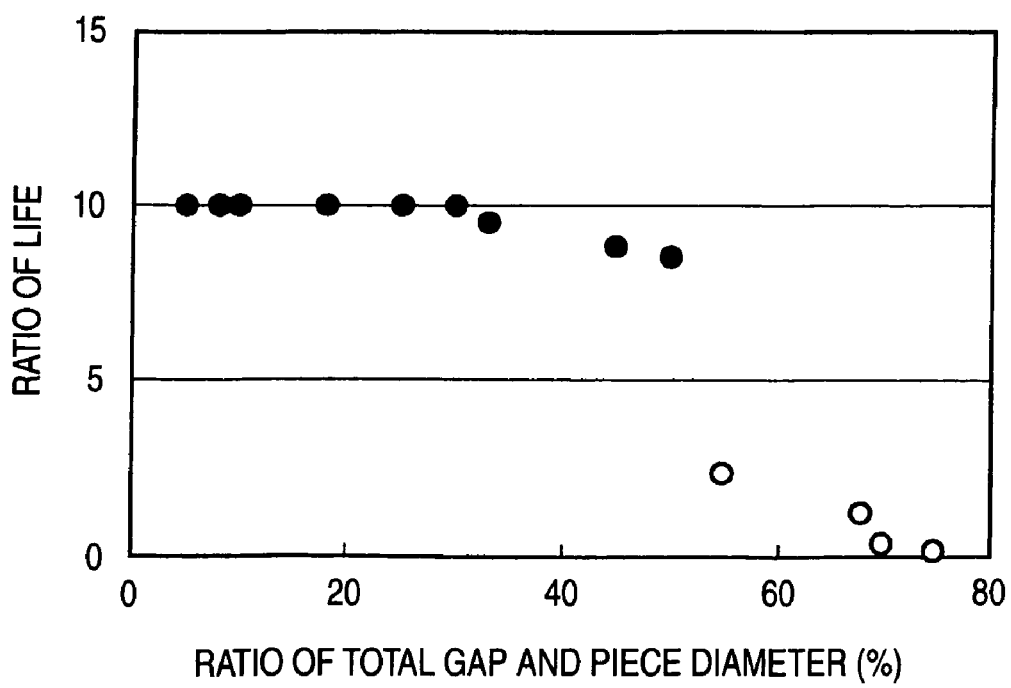
FIG. 6 is a view showing the relationship between a sum total of the retaining pieces and the balls vs. the life of the ball screw apparatus in the ball screw apparatus using an outer diameter being 0.60 times of the ball diameter and radius of curvature R of the edge portion opposite to the ball being 0.2 mm.

Next, results where effects of the ball screw apparatus of the invention having the above mentioned structure were confirmed by a life test are shown in FIGS. 4 to 6. As to the life test, by use of an endurance life testing machine of the ball screw apparatus (made by Nihon Seiko Kabushiki Kaisha), as shown in FIG. 3, under a condition of setting the sum total Σ of the spaces C between the retaining pieces 10 and the balls 5 (the shortest distance between the front end of the ball 5 contacting the recess 11 of the retaining piece 10 and the front end of the ball 5 separating from the recess 11 of the retaining piece 10) to be larger than a usual using state, and assuming as a life a working torque becoming more than two times of a starting condition by breakage of the retaining piece 10 by falling of the retaining piece 10 or interference of the retaining piece 10 with the wall of the ball rolling path T or the ball circulating path J, the testing time was thus recorded. Of 10 test pieces, times when the ball screw apparatus reached the life of 10% were obtained from the sides of short lives by Weibull function distributions, and those were taken as test lives. The tests were carried out under a heavy load condition usually used in the injection molding machine, and lives of calculation under the testing condition (called as "calculation life" hereafter) were demanded, and the tested results were shown with ratio of the calculation life time vs. testing time. The tests were closed at values of 10 times of the calculation life.

The basic testing conditions of the present life test are shown under.

(Basic Testing Conditions)

Bearing number: Ball screw apparatus 25×10×500–C5 (ball diameter 3/16 in. made by Nihon Seiko Kabushiki Kaisha)

Testing load: Axial load=5800N (P/C=0.5)

Maximum rotation number: 100 to 200 rpm

Stroke: 60 mm

Circulatory grease: Albania No. 2 (made by Showa Shell Oil)

TEST EXAMPLE 1

In addition to the above basic testing conditions, the used retaining piece 10 had the outer diameter L1 of 0.75 times of the diameter D of the ball 5. The sum total Σ of the spaces C between the retaining pieces 10 and the balls 5 was taken as a maximum sum total Σ assuming that the retaining pieces 10 could be held between the balls 5, and it was determined to be 50% of the outer diameter L1 of the retaining piece 10. Under the above mentioned condition, the life test was carried out by changing the radius of curvature R of the edge portion opposite to the ball 5 of the retaining piece 10. Results are shown in Table 1 and FIG. 4.

TABLE 1

| Ex. | R-shapes (mm) of edge portions of retaining pieces | Ratios of lives |
|---|---|---|
| 1 | 0.05 | 10 |
| 2 | 0.08 | 10 |
| 3 | 0.10 | 10 |
| 4 | 0.15 | 10 |
| 5 | 0.20 | 10 |
| 6 | 0.30 | 10 |
| 7 | 0.38 | 10 |
| 8 | 0.45 | 10 |
| 9 | 0.50 | 10 |
| 10 | 0.74 | 9.2 |
| 11 | 0.98 | 7.2 |
| Com. Ex. | | |
| 12 | 1.25 | 1.3 |
| 13 | 1.58 | 0.8 |
| 14 | 2.30 | 0.4 |

Ex.: Examples,
Com. Ex.: Comparative Examples

Figure 10:
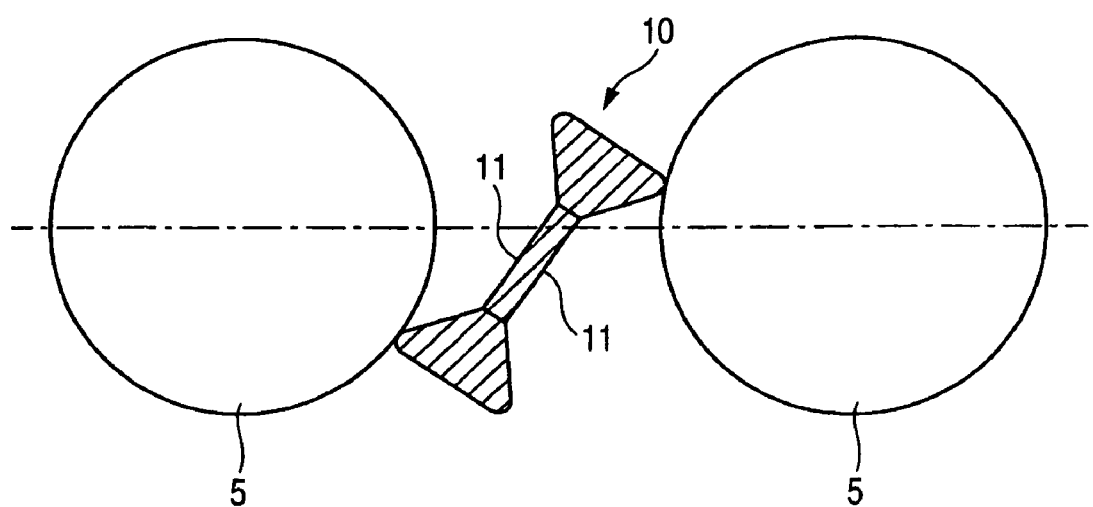
FIG. 10 is a cross sectional view showing the retaining piece falling down in the ball screw apparatus of FIG. 9.

As shown in Table 1 and FIG. 4, it is seen that if the radius of curvature R of the edge portion opposite to the ball 5 of the retaining piece 10 exceeds 1 mm, the life considerably goes down. This fact is assumed that if the radius of curvature R exceeds 1 mm, since a diagonal line L3 in the cross section of the retaining piece 10 shown in FIG. 1 and a width L2 of the retaining piece 10 excepting the edge portion in the tracking direction X of the ball 5 become short, the retaining piece 10 falls down as seeing in FIG. 10. It is accordingly possible to realize a long life by defining to be 1 mm or shorter the radius of curvature R of the edge portion opposite to the ball 5 of the retaining piece 10, and the radius of curvature R is preferably defined to be 0.5 mm or shorter for enabling to certainly suppressing the increase of torque owing to the fall of the retaining piece 10.

TEST EXAMPLE 2

In addition to the above basic testing conditions, the used retaining piece 10 had the radius of curvature R of the edge portion opposite to the ball 5 being 0.2 mm. The sum total Σ of the spaces C between the retaining pieces 10 and the balls 5 was determined to be 50% similarly to the test example 1. Under the above mentioned condition, the life test was carried out by changing the outer diameter L1 of the retaining piece 10. Results are shown in Table 2 and FIG. 5.

TABLE 2

| Ex. | L1/D (L1: Outer diameter of Retaining Piece, D: Diameter of Ball) | Ratios of lives |
|---|---|---|
| 1 | 0.60 | 8.5 |
| 2 | 0.63 | 9.1 |
| 3 | 0.70 | 10 |
| 4 | 0.75 | 10 |
| 5 | 0.80 | 10 |
| 6 | 0.83 | 9.2 |
| 7 | 0.85 | 8.7 |
| Com. Ex. | | |
| 8 | 0.52 | 2.7 |
| 9 | 0.50 | 1.3 |
| 10 | 0.45 | 0.1 |

TABLE 2-continued

| | L1/D (L1: Outer diameter of Retaining Piece, D: Diameter of Ball) | Ratios of lives |
|---|---|---|
| 11 | 0.88 | 4.1 |
| 12 | 0.90 | 3.1 |
| 13 | 0.93 | 2.7 |

Ex.: Examples
Com. Ex.: Comparative Examples

As shown in Table 2 and FIG. 5, it is seen that if the outer diameter L1 of the retaining piece 10 is less than 0.60 times or 0.85 times of the diameter D of the ball 5, the life considerably goes down. This fact is assumed that if the outer diameter L1 of the retaining piece 10 is less than 0.60 times of the diameter D of the ball 5, such a case might occur that the ball 5 cannot hold the retaining piece 10, so that the retaining piece 10 falls by a small space C. On the contrary, if the outer diameter L1 of the retaining piece 10 is 0.85 times of the diameter D of the ball 5, when the retaining piece 10 passes the ball rolling path T or the ball circulating path J, it contacts the wall or connected part and brings about the bad working or earlier damage. It is accordingly possible to realize a long life by defining the outer diameter L1 of the retaining piece 10 to be 0.60 times or above to 0.85 times or below of the diameter D of the ball 5, and further the outer diameter L1 of the retaining piece 10 to be 0.70 times or above to 0.80 times or below of the diameter D of the ball 5 for enabling to certainly suppressing the increase of torque owing to the fall of the retaining piece 10.

TEST EXAMPLE 3

In addition to the above basic testing conditions, the used retaining piece 10 had the outer diameter L1 of 0.60 times of the diameter D of the ball 5, and the radius of curvature of the edge portion opposite to the ball being 0.2 mm. The life test was carried out by changing the sum total Σ of the spaces C between the retaining pieces 10 and the balls 5. Results, are shown in Table 3 and FIG. 6. Herein, assuming that the rate of the sum total 2 of the spaces C between the retaining pieces 10 and the balls 5 vs. the outer diameter L1 of the retaining piece 10 is ΣL, it is shown in the following formula.

$$\Sigma L = \Sigma / L1 \times 100(\%)$$

TABLE 3

| Ex. | Rates (%) between sum total Σ of spaces and outer diameters of retaining pieces | Ratios of lives |
|---|---|---|
| 1 | 50 | 8.5 |
| 2 | 45 | 8.8 |
| 3 | 33 | 9.5 |
| 4 | 30 | 10 |
| 5 | 25 | 10 |
| 6 | 18 | 10 |
| 7 | 10 | 10 |
| 8 | 8 | 10 |
| 9 | 5 | 10 |
| Com. Ex. | | |
| 10 | 55 | 2.3 |
| 11 | 68 | 1.2 |

TABLE 3-continued

| | Rates (%) between sum total Σ of spaces and outer diameters of retaining pieces | Ratios of lives |
|---|---|---|
| 12 | 70 | 0.3 |
| 13 | 75 | 0.1 |

Ex.: Examples
Com. Ex.: Comparative Examples

As shown in Table 3 and FIG. 6, it is seen that if the rate ΣL of the sum total Σ of the spaces C between the retaining pieces 10 and the balls 5 vs. the outer diameter L1 of the retaining piece 10 exceeds 50%, the life considerably goes down. It is accordingly possible to realize a long life by defining to be 50% or less the rate ΣL of the sum total Σ of the spaces C between the retaining pieces 10 and the balls 5 vs. the outer diameter L1 of the retaining piece 10, and further it is desirable that ΣL is to be 30% or less for enabling to certainly suppressing the increase of torque owing to the fall of the retaining piece 10.

As seeing from the above test examples 1 to 3, the edge portion opposite to the ball 5 of the retaining piece 10 is rounded, the radius R of curvature of the edge portion is defined to be 1 mm or less, and the outer diameter L1 of the retaining piece 10 is determined to range 0.60 times or more to 0.85 times or less of the diameter D of the ball 5, desirably 0.70 times or more to 0.80 times or less, whereby it is possible to suppress the retaining piece 10 from contacting the wall of the ball rolling path T or ball circulating path J, and suppress the retaining pieces 10 between the balls 5 from fall down. That is, such a ball screw apparatus can be offered which enables to more improve low noises, operationability and endurance.

Figure 7A:
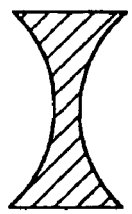
FIGS. 7A, 7B and 7C are cross sectional views showing cross sectional examples of the retaining pieces.
Figure 7B:
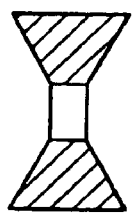
Figure 7C:
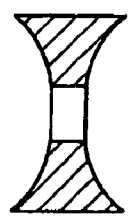

In the embodiment, the cross section of a recess 11 of the retaining piece is shaped in R approximate to the sphere of the ball 5 as shown in FIG. 7A, but not limited thereto, and a conical shape shown in FIG. 7B or a Gothic arch of FIG. 7C will do. Further, as shown in FIGS. 7B and C, a penetration may be formed in a central part. The recess 11 may have a surface rugged with holes, dimples or grooves, or smooth with a surface roughness Ra being 50 μm, and by making the surface rugged, a lubricant is advantageously easy to kept.

The embodiment uses the retaining pieces 10 where the outer diameter L1 of the retaining pieces 10 and the outer diameter of the recess 11 are almost the same, but not limited thereto, for example, such retaining pieces having a larger outer diameter L1 than the outer diameter of the recess 11 may be adopted.

Further, the embodiment uses the cylindrical retaining pieces 10, but not limited thereto, the retaining piece may have other shapes as polygonal.

The mechanism of the ball screw apparatus according to the invention can be applied to any linear-motion apparatus such as the ball spline apparatus, linear guide apparatus, or linear ball bush apparatus.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

[Effects of the Invention]

As mentioned above, according to the ball screw apparatus of the invention, it is possible to suppress the retaining pieces from contacting the wall of the ball rolling path T or ball circulating path J, and suppress the retaining pieces 10 between the balls 5 from fall down, so that such a ball screw apparatus can be offered which enables to more improve low noises, operationability and endurance.

What is claimed is:

1. A ball screw apparatus comprising:
a screw shaft having a first spiral screw groove on an outer circumferential face thereof;
a nut having a second screw groove on an inner circumferential face in opposition to the first screw groove defined in the screw shaft and being in mesh with the screw shaft via a plurality of balls rotatably charged in a spiral ball rolling path defined between the first and second screw grooves; and
a plurality of retaining pieces respectively interposed between the adjacent balls and having recess portions in opposite faces to the balls,
wherein an edge portion of each of the retaining pieces in the opposite face to the respective balls is rounded with a radius of curvature of the edge portion being 0.05 mm to 0.5 mm;
wherein the height of each of the retaining pieces is in the range of 0.60 times to 0.85 times of the diameter of each of the balls,
wherein the balls and the retaining pieces disposed within the spiral ball rolling path satisfy following equations (1) and (2), $$\Sigma L = \Sigma/L1 \times 100(\%) \quad (1)$$

$$\Sigma L \leq 0.5 \quad (2)$$

where Σ is the sum total Σ of spaces defined between the retaining pieces and the balls, L1 is the outer diameter of each of the retaining pieces, and ΣL is a rate of the sum total Σ of spaces defined between the retaining pieces and the balls relative to the outer diameter L1 of the holding piece.

2. The ball screw apparatus as set forth in claim 1, wherein the height of each of the retaining pieces in the range of 0.70 times to 0.80 times of the diameter of each of the balls.

3. A ball screw apparatus as set forth in claim 1,
wherein the height of each of the retaining pieces in the range of 0.70 times to 0.80 times of the diameter of each of the balls.

* * * * *